Aug. 20, 1940.  J. B. McMULLEN  2,212,164
ROAST HOLDER
Original Filed Dec. 10, 1935   3 Sheets—Sheet 1
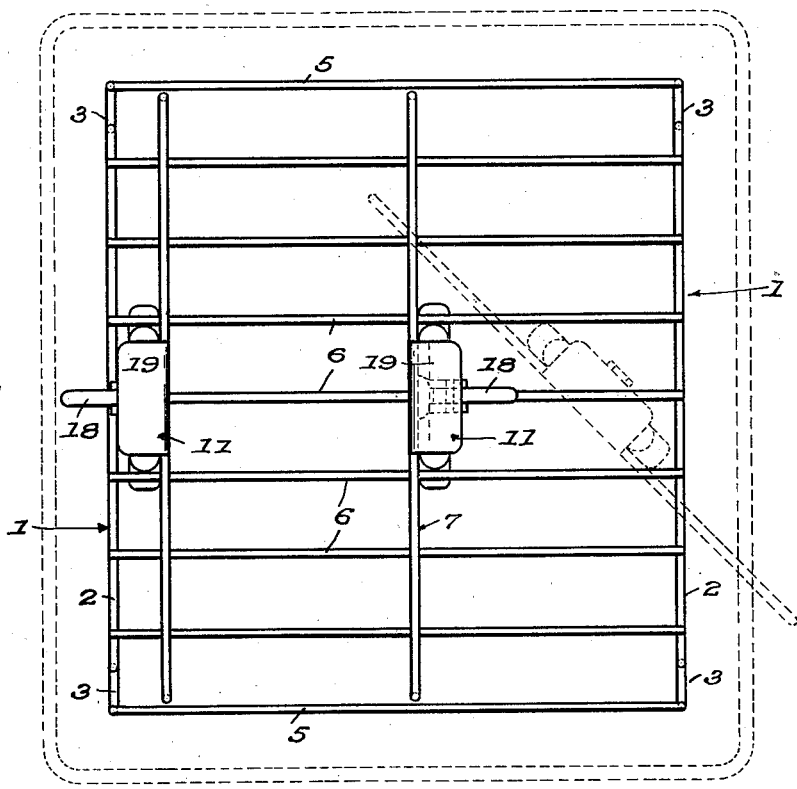
Fig.1
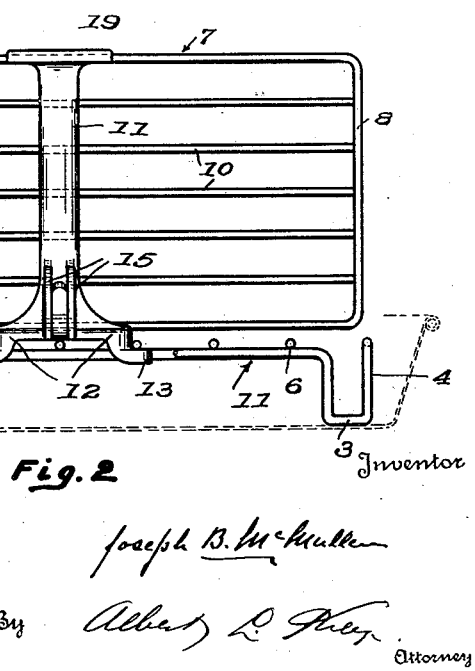
Fig.2
Fig.3
Inventor
Joseph B. McMullen
By Albert L. Ely
Attorney Aug. 20, 1940.  J. B. McMULLEN  2,212,164
ROAST HOLDER
Original Filed Dec. 10, 1935  3 Sheets-Sheet 2

Inventor
Joseph B. McMullen
By Albert L. Kreig
Attorney

Aug. 20, 1940.  J. B. McMULLEN  2,212,164
ROAST HOLDER
Original Filed Dec. 10, 1935   3 Sheets-Sheet 3
Fig. 8.
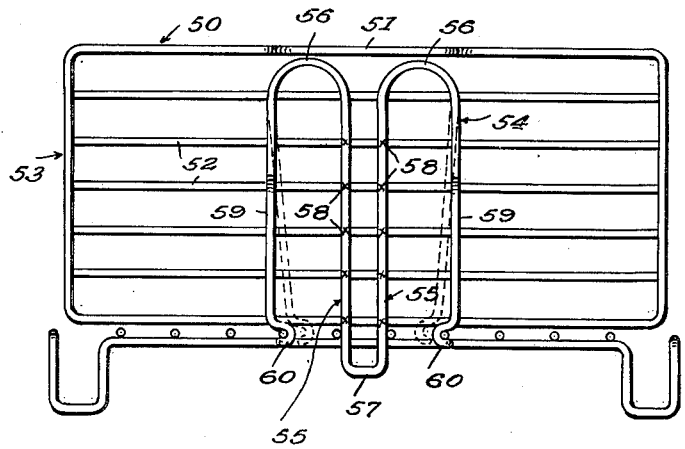
Fig. 9.
Fig. 10.
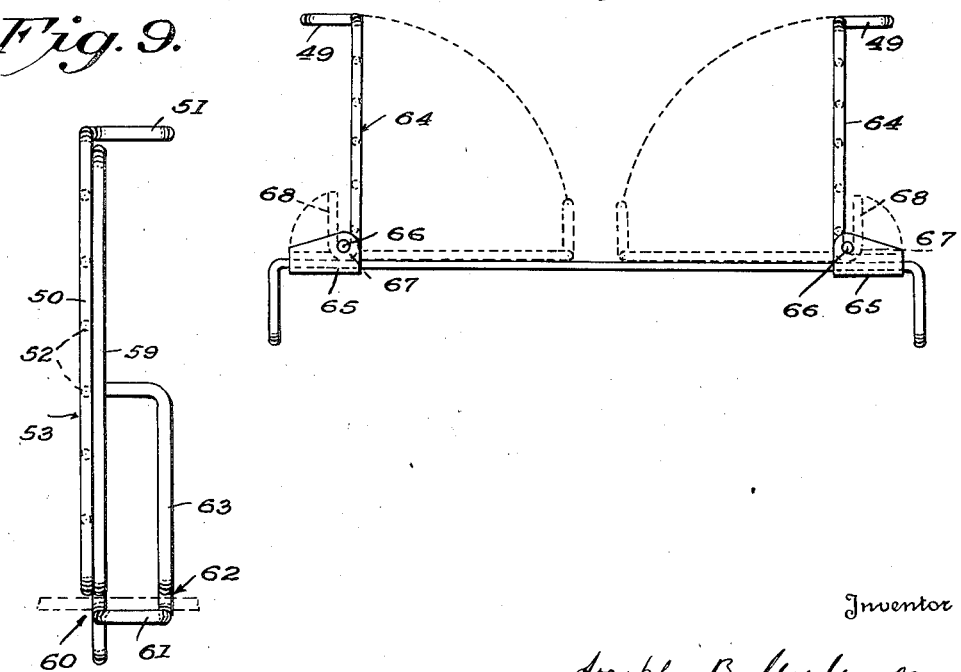
Inventor
Joseph B. McMullen
By Albert L. Frey
Attorney Patented Aug. 20, 1940

2,212,164

UNITED STATES PATENT OFFICE 2,212,164

ROAST HOLDER

Joseph B. McMullen, Washington, D. C.

Application December 10, 1935, Serial No. 53,767
Renewed August 26, 1937

20 Claims. (Cl. 53—5)

My invention relates to domestic cooking utensils and more especially to those devices adapted for oven use in the baking, broiling or roasting of meats and other foods.

An object of the invention is to provide a food or roast holder arranged in such a manner that the desired amount and extent of cooking may be obtained with a low expenditure of heat.

The invention further contemplates the provision of a base or bottom support and side support for the food, the latter being adjustable in respect to the bottom support for contact with the food and away therefrom at will, for the purpose of holding or permitting a turning of the food in the desired position. This arrangement is of particular advantage, since in the roasting or broiling of meats it is necessary to turn the meat from time to time to insure the desired cooking. The adjustment of one or more side supports against and in contact with the meat serves to hold the same in the desired or selected position for initial and subsequent cooking.

A further object of the invention is to provide an appliance that will securely hold in a fixed position the roast while in the process of cooking. This arrangement is of particular advantage especially with small roasts, meat rolls, and fish, as a misshapen roast is often distorted during cooking and is consequently misshapen which at times may render carving and serving difficult.

A further object of this invention is to provide an appliance to hold a roast in the process of cooking in such manner as to allow the oven heat to contact with its entire surface, which will mean a uniform roasting process.

Another object of this invention is to provide an appliance that can be easily handled and adjusted in supporting the roast for cooking, and also for lifting the roast out of the pan for serving and one that can be folded and taken apart for cleaning and storing.

Provision is also made for a folding of the side walls in some instances to reduce the over-all heighth of the roast holder to facilitate storing.

A detailed description of the several embodiments of the invention is hereinafter set forth, reference being had to the accompanying drawings in which:

Figure 1 is a plan view of one form of roast holder, a supporting or drip pan being shown in dotted lines;

Figure 2 is a side view of Figure 1;

Figure 3 is a detailed view illustrating the locking means by which the side supports are released or held in selected position;

Figure 8 is a side view of another form of locking means for the side support;

Figure 9 is an end view of the side support of Figure 8;

Figure 10 is a view illustrating another type of roast holder wherein the side supports may be folded downwardly to facilitate packing or storing.

Figure 6:
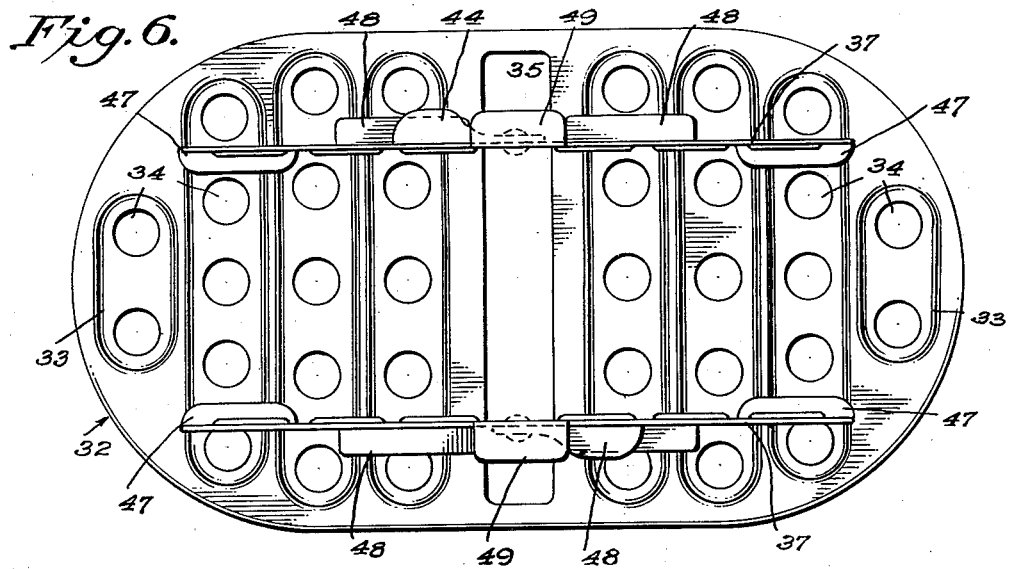
Figure 6 is a plan view of a roast-holder wherein the bottom support and side supports are fashioned from plates which are corrugated and perforated and illustrating the locking device for the side supports.

In Figures 1 to 3, the roast holder is provided with a bottom support, consisting of a bottom frame member or bar 1, having a transverse portion 2, bent downwardly to form supporting legs 3 which may rest in a drip pan shown in dotted lines. A portion of the leg 3 is bent upwardly as at 4 to form the horizontal portion 5. A plurality of bars 6 are attached to the transverse portion, by welding or in any other suitable manner and lie preferably in the same plane as the horizontal portions 5.

Side supports 7 for the meat are provided and one or more of these are adjustable in respect to the bottom support and consequently movable toward and away from the meat to firmly hold the same in any selected position, and to release the same when desired. Each side support 7 consists preferably of a frame member 8 across which extends the bars 10. Each support 7 includes and is suitably attached to a vertical bracket 11, the lower end of which is provided with legs 12 having extensions 13 which lie beneath several of the bars 6 as shown in Figure 2. Shoulders 14 are formed preferably on the legs 12 and are arranged to move freely between the bars 6 as shown in Figures 1 and 2 so as to guide the side supports without binding in the movements to selected positions.

Lugs 15 extend outwardly from the bracket and carry a pin 16 upon which is pivotally mounted the eccentric 17 adapted at times to engage the upper surface of one of the bars 6 as shown in Figures 2 and 3. The eccentric is provided with an operating handle 18 and the position of the pin 16 and/or the shaping of the eccentric should be such that the bracket with the side support is locked or released by a suitable movement of the handle. A convenient form is shown in Figure 3 where the handle 18 in its lower position serves to hold a bracket 11 in a desired position (due to the engagement of the extensions 13 with the bars 6) and when moved to its upper position releases the bracket and permits its movement to any desired position. The upper end of the bracket 11 may be provided with an extension handle 19. When it is desired to remove the side supports from the base or bottom support, the eccentrics 17 are released, and the side supports turned, as shown in dotted lines in Figure 1, so that the lugs 13 clear the bars 6.

When the device is put in use, the food is placed upon the bars 6. The two side supports 7 may thereupon be moved against the food to support the same, or if one of the side supports is fixed or permanent the other support need only be moved so that the food is held firmly between the two supports. The eccentric 17 of the side support so moved, is adjusted to hold the support in selected position. When it is desired to turn the food for further cooking, or to remove the same from the holder, one or both of the side supports may be moved away from the food upon a release of the eccentric.

Figure 4:
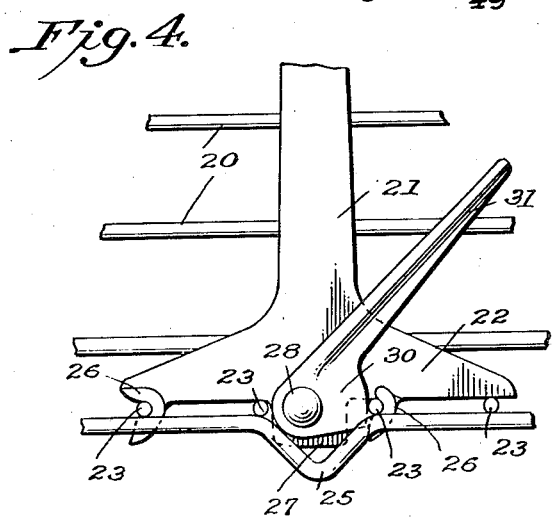
Figure 4 is a side view of another form of locking means for the side support.
Figure 5:
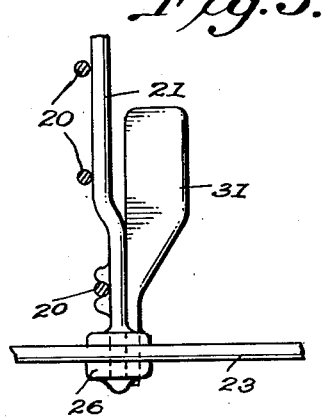
Figure 5 is an end view of Figure 4.

Figures 4 and 5 illustrate a slightly different type of locking mechanism for the side supports than that disclosed in Figures 1, 2 and 3.

In Figures 4 and 5 the horizontal bars 20 are similar to the bars 10 of Figures 1 to 3 and are attached to the bracket 21. The lower end of the bracket is widened or flared outwardly as at 22 and rests upon several of the bars 23 of the bottom support. The transverse bar 24 corresponds to the transverse bar 2 of Figures 1 to 3 and intermediate of its ends may be bent downwardly to form the angle portion 25 to provide an additional leg for the bottom support. The flared portion of the bracket carries two or more lugs 26 which are slotted or bifurcated and adapted to engage two or more of the bars 23, the slots or bifurcations in the lugs opening in the same direction as shown in Figure 4. The flared portion of the bracket also carries a downwardly projecting lug 27 to which is pivoted as at 28 the eccentric 30 having an operating handle 31. It will be noted that in Figures 4 and 5 the plane of movement of the eccentric handle is parallel to the plane of the side support whereas in Figures 1 to 3 the plane of movement of the handle is at right angles thereto. The shape of the eccentric 30 and the location of the pivot 28 should be such that when the handle is moved downwardly the surface of the eccentric working against one of the bars 23 tends to force the bracket toward the left whereupon the left hand edge of the depending lug 27 engages the bar 23 adjacent thereto thus locking the bracket and side support against movement. One or both lugs 26 may be used to lock the bracket instead of the edge of the lug 27.

Upon an upward movement of the handle the bracket and side support will be released for adjustment to any desired position. Should it be desired to remove the side support from the bottom support for cleaning or storing it is only necessary to move the eccentric to a release position whereupon the side support may be moved slightly to the right to disengage the lugs 26 from the bars 23. It should be understood of course that the operative positions of the eccentric may be reversed so that upon a downward movement of the handle the bracket is released and upon an upward movement of the handle the bracket is locked to the bottom support.

Figure 7:
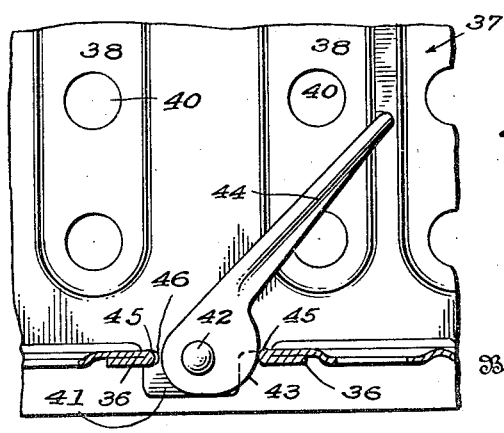
Figure 7 is a fragmentary side view illustrating the locking arrangement for the side supports of Fig. 6.

In Figures 6 and 7 there is disclosed another form of roast-holder which while different in some respects from the other forms herein described nevertheless embodies basic features of my invention. In Figure 6 there is illustrated in plan view a bottom support 32 upon which the food or roast rests. This bottom support 32 takes the form of a plate fashioned with a series of flutes or corrugations 33 in which are formed apertures 34 for draining the support. The bottom support or plate 32 contains a central aperture 35 which is formed by bending portions of the plane 32 upon itself as at 36, the purpose of which will be hereinafter described. Side supports 37, one or more of which may be movable in respect to the bottom support of 32, are provided. These side supports perform the same function as those disclosed in Figures 1 to 3 i. e. when the food is put upon the bottom support one or both of the side supports may be moved to engage the food and hold it in the selected position and when the food is to be turned or removed from the holder one or more of the side supports are moved to release the food.

One of the side supports may occupy a permanent or fixed position and the other may be movable or both may be movable in respect to each other and the bottom support. Preferably, in the construction of Figures 6 and 7 the side supports 37 are fluted or corrugated as at 38 and provided with apertures 40. The side support 37 carries a depending lug 41 to which is pivoted as at 42 the eccentric 43. A handle 44 is provided to operate the eccentric.

The position of the pivot 42 and the shape of the eccentric 45 should be such that upon a downward movement of the handle 44 the side support is locked to the bottom support and upon an upward movement of the handle the side support is released from locking engagement. Of course the eccentric can be so arranged so that an upward movement of the handle locks the side support and a downward movement releases the same. The depending lug 41 enters and projects through the slot 35, as shown in Figure 7. The aperture 37 is defined in part by the side walls 45. The left hand edge of the lug 41 is adapted to engage at times the left hand wall 45 or the lug may be recessed, as shown at 46, for the reception of the left hand edge 45. When it is desired to lock the side support to the bottom support in any selected position, the side support is moved to the desired position, whereupon the handle 44 is depressed, causing the eccentric to bear against the right hand edge 45, whereupon the side support is caused to move slightly to the left, thereby engaging securely the left hand end wall 45. When it is desired to adjust the side support or remove the same from the bottom support, the handle 44 is lifted, thereby releasing the side support from engagement with the edges 45. The side support may now be moved to any other selected position, or if removal from a bottom support is desired, the side support is moved slightly to the right, whereupon it may be lifted clear of the bottom support.

The lower edges of the side supports are bent inwardly to form guiding flanges 47 and are also bent outwardly to form similar flanges 48. These flanges 47 and 48 are from a bearing surface for the side supports, aid the sliding movement of the side supports and serve to maintain the side supports in vertical position. The side supports may be provided with handles 49.

In Figures 8 and 9 another form of side support for a roast holder is shown. Here a frame member 50 illustrated in rectangular form is bent outwardly along its top to form a handle 51. Bars 52 extend across the frame member in a manner similar to that shown in Figure 2 and form the side support 53.

A vertical bracket or holder 54 is attached to and forms a part of the side support 53 and consists of outer resilient legs 59 and intermediate legs 55, the outer legs being connected to the inner legs by the curved portions 56 and the intermediate legs preferably connected to each other by the horizontal portion 57.

The intermediate legs are secured to the side support by welding or other suitable means as at 58 while the outer legs are free to flex. The intermediate legs 55 preferably lie adjacent to and project downwardly between the bars of the bottom support and serve to guide and support the side support. The lower portion of each outer leg is bent inwardly to form loops 60 and then forwardly into a horizontal portion 61, see Figure 5, and thence inwardly to form a second loop 62 corresponding to the loop 60. From the second loop the bar material or wire from which the legs are formed continues upwardly and then horizontally to form the handle 63 as shown in Figure 9. The horizontal portions of the handle may be attached to the legs 54. The outer legs 59 and especially the lower portions thereof just described are normally sprung outwardly and through the loops 60 and 62 engage selected bars of the base or bottom support which is similar to that described in connection with Figures 1 to 3, thus serving to hold the side support in any selected position. When it is desired to move or adjust the side supports, the outer legs 59 are drawn toward one another by the handles 63 thus breaking the firm engagement of the loops 60 and 62 with the bars of the bottom support. When the desired position is reached the handles 63 are released whereupon the loops 60 and 62 again engage the bars and hold the side supports in the selected position. When it is desired to remove the side supports from the base, the handles 63 may be drawn toward one another to the dotted line position shown in Figure 8. The loops 60 and 62 of each support, being spaced substantially from each other, prevent any tilting or rocking movement of the supports and serve in conjunction with the spring pressure of the legs to prevent any movement of the side supports from the selected position.

In Figure 10 there is shown another form of roast holder, wherein the side supports 64 are mounted in brackets 65 fashioned for sliding movement upon bars of the bottom support. The bracket 65 carries a pin 66 which passes through a looped portion 67 of the side support 64. An extension 68 of the side support projects at right angles to the vertical portion of the side support and engages the bracket 65 when the side support is in vertical position, thus providing an arrangement whereby the side support is held in vertical position when moved against and into contact with the food. Each side support may be provided with an outwardly extending handle 49. The brackets 65 engage bars of the bottom support 47 in such a way that when pressure is exerted upon the end support 45, the bracket owing to its long bearing surface will bind and lock itself in the selected position. When it is desired to store the holder, the side supports 65 may be turned downwardly and inwardly about the pin 66 to the dotted line position indicated in Figure 10. This arrangement reduces the over-all heighth of the holder when not in use. The bottom support of Figure 10 may take the form of the bottom supports of Figures 2 and 8. The brackets 65 are carried by outer bars similar to the bars 5 of Figure 1.

What is claimed is:

1. In a roast holder, the combination of a grilled or perforated bottom support for the food to be cooked, a plurality of grilled or perforated removable side supports carried thereby, at least one of the side supports being adjustable in respect to the bottom support and means for maintaining the movable side support in its adjustable position and for releasing the same.

2. In a roast holder, the combination of a grilled or perforated bottom support for the food to be cooked, grilled or perforated removable side supports carried thereby and adjustable one toward or away from the other and means for maintaining the side supports in their adjusted positions and for releasing the same.

3. In a roast holder, the combination of a grilled or perforated bottom support, grilled or perforated removable side supports carried thereby and adjustable in respect to said bottom support and means carried by said side support for locking the same to the bottom support and releasing it therefrom for sliding movement.

4. In a roast holder, the combination of a plurality of bars, certain of which are arranged at an angle to others and providing a bottom support, removable side supports carried by a plurality of bars of the bottom support and movable in respect thereto, and means for locking the side supports in any selected position in respect to the bottom support.

5. In a roast holder, the combination of a plurality of longitudinal and transverse bars arranged to form a bottom support, a removable side support movable in respect to the bottom support, a bracket forming a part of and carrying the side support, said bracket having extensions engaging one side of certain of said bars, and a locking and releasing device carried by said bracket and engaging the opposite surface of another of said bars.

6. In a roast holder, the combination of a plurality of longitudinal and transverse bars arranged to form a bottom support, a removable side support movable in respect to the bottom support, a bracket forming a part of and attached to the side support, extensions on the bracket engaging certain of said bars, and a locking and releasing device carried by said bracket and engaging other of said bars.

7. In a roast holder, the combination of a plurality of longitudinal and transverse bars arranged to form a bottom support, a removable side support movable in respect to the bottom support, a bracket associated with the side support, said bracket having extensions, engaging certain of said bars when moved in one direction and to release the same when moved in the opposite direction.

8. In a roast holder, the combination of a grilled or perforated bottom support, grilled or perforated removable side supports carried thereby at least one of the side supports being adjustable in respect to the bottom support, and a cam carried by the side support and engaging the bottom support movable to the locking and releasing position.

9. In a roast holder, the combination of a bottom support, a portion of which is provided with an opening, edges of which engage a locking and releasing mechanism, removable side supports carried by the bottom support, at least one of the side supports being adjustable in respect to the bottom support, a locking and releasing mechanism carried by the side support and engaging the edges of the opening in the bottom support for locking the side support to the bottom support and for releasing the same therefrom.

10. In a roast holder the combination of a bottom support provided with an opening therein, the edges of which engage a locking and releasing mechanism, removable side supports carried by the bottom support, at least one of the side supports being adjustable in respect to the bottom support, a bracket carried by the side support, a lug formed on the bracket and projecting through the opening formed in the bottom support having a surface adapted to engage one of said edges, a cam carried by the side support and adapted to engage another of said edges and a handle for actuating the cam to cause the lug and cam to engage said edges when in one position and to release said cam and lug when moved to another position.

11. In a roast holder, the combination of a bottom support, comprising a plurality of bars fixed in spaced relation, a removable side support carried thereby and adjustable thereon, a bracket associated with the side support, means connected to the lower end of said bracket for engaging at least one of said bars of the bottom support and means associated with the side support and engaging at least another of the bars of the bottom support for locking the side support to the bottom support and releasing the side support from the latter.

12. In a roast holder the combination of a plurality of bars arranged to form a bottom support, a removable side support carried by and movable in respect to the bottom support, a bracket associated with the side support, said bracket having a portion affixed to the side support and another portion free for movement in respect thereto, said free portion being resilient and normally sprung outward to engage at least one of the bars of the bottom support, whereby to lock the side support to the bottom support, and when moved inwardly to release the side support from engagement with the bottom support.

13. In a roast holder, the combination of a plurality of bars arranged to form a bottom support, a bracket carried by certain of said bars and slidable thereon, removable side support pivotally mounted on said bracket and provided with a stop engaging said bracket when the side support occupies a vertical position, and a pivot connecting the side support to the bracket about which the side support may be turned to move the side support to a horizontal position and in proximity to the bottom support.

14. In a roast holder, the combination of a bottom support provided with an opening therein, a removable side support including a bracket provided with at least one lug for engaging the bottom support and at least one of the walls defining said openings, and means associated with the side support and engaging a portion of the bottom support for locking and releasing the side support in respect to the bottom support.

15. In a roast holder, having adjustable side walls so constructed and arranged to engage the food to be cooked, a support connected to said side walls, means for holding said side walls in substantially parallel relation to each other, at least one of said side walls adjustable to and from the other, and means for maintaining said side walls in adjustable position and for releasing the same.

16. In a roast holder, having adjustable side walls so constructed and arranged to engage the food to be cooked, means for holding said side walls in substantially perpendicular position, said side walls adjustable to and from each other and means for maintaining said side walls in adjustable position and for releasing the same.

17. In a roast holder, having adjustable clamping means, a member extending between said clamping means, said clamping means adjustable to and from each other on said member, and means for holding said clamping means in fixed relation to each other when in operative position.

18. In a roast holder, the combination of a bottom support for the food to be cooked, a plurality of removable side supports carried thereby and at least one adjustable toward and away from another, and means for maintaining the side supports in the adjusted position and for releasing the same.

19. In a roast holder, the combination of side supports so constructed and arranged to engage the food to be cooked, means by which the side supports are carried, and means for adjusting at least one of said side supports in respect to another, and means for maintaining the side supports in their adjusted position.

20. In a roast holder, the combination of side supports so constructed and arranged to engage the food to be cooked, means by which the side supports are carried, and means for adjusting at least one of said side supports in respect to another, and means for maintaining the side supports in their adjusted position, and for releasing the same.

JOSEPH B. McMULLEN.